United States Patent
Birk et al.

Patent Number: 6,021,857
Date of Patent: Feb. 8, 2000

[54] DRILL BIT

[75] Inventors: Rudi Birk, Aetenstadt, Germany; Werner Ferstl, Reutte, Austria; Ronald Huber, Vils, Austria; Walter Lempach, Wangle, Austria

[73] Assignees: Black & Decker Inc., Newark, Del.; Plansee Tizit, Tirol, Austria

[21] Appl. No.: 08/932,092

[22] Filed: Sep. 17, 1997

[30] Foreign Application Priority Data

Sep. 21, 1996 [GB] United Kingdom ............... 9619795

[51] Int. Cl.⁷ ........................................... B23B 51/02
[52] U.S. Cl. ............................... 175/415; 408/230
[58] Field of Search ....................... 175/389, 390, 175/395, 415, 420, 420.1; 408/229, 230

[56] References Cited

U.S. PATENT DOCUMENTS

| | | |
|---|---|---|
| 2,879,036 | 3/1959 | Wheeler . |
| 4,189,266 | 2/1980 | Koslow .................................. 408/224 |
| 4,968,193 | 11/1990 | Chaconas et al. ....................... 408/211 |
| 5,492,187 | 2/1996 | Neukirchen et al. .................... 175/415 |

FOREIGN PATENT DOCUMENTS

| | | |
|---|---|---|
| 0123878 | 4/1984 | European Pat. Off. . |
| 0761927 | 5/1997 | European Pat. Off. . |
| 1270347 | 10/1970 | United Kingdom . |
| 1378342 | 1/1972 | United Kingdom . |
| 2201910 | 9/1988 | United Kingdom . |

OTHER PUBLICATIONS

U.S. Ser. No. 256,749, Silsby, filed May 05, 1897.

*Primary Examiner*—William Neuder
*Attorney, Agent, or Firm*—Charles E. Yocum; Dennis A. Dearing; John D. Del Ponti

[57] ABSTRACT

A masonry drill bit having an active diameter of D, comprising a shaft and a tip 1 for engaging a workpiece, wherein the tip 1 is formed with a plurality of stepped portions shaped to cut a workpiece as the drill bit rotates. By virtue of the drill bit tip 5 configuration as described and claimed herein, a masonry drill bit 1 having improved performance is provided.

16 Claims, 4 Drawing Sheets

DRILL BIT

The present invention relates to a drill bit, and in particular to a drill bit which is usable with rotary or percussion drills or electro-pneumatic hammers.

Such a drill bit is of particular use when drilling concrete, aggregate, brick, natural stone or similar material, and hereafter is referred to as a masonry drill bit.

In known masonry drill bits, a hard metal or carbide tip is provided with edges for drilling the materials described above. The tip is usually brazed into an end of a drill bit shaft. The shaft is usually a helically twisted steel web having a shank at its free end for insertion into a chuck mechanism of a tool such as those noted above.

Known masonry bits can cope adequately with many of the materials into which they are required to drill. However, one material in particular is known to cause problems with masonry drill bits. This material is reinforced concrete or 'rebar'.

Reinforced concrete comprises a mixture of cement and gravel (concrete) reinforced by steel rods. The steel rods improve the strength of the concrete and prevent the structure from collapsing if the concrete fails. Typically, the reinforcing rods are prestressed further to enhance the material properties of the reinforced concrete.

However, it is the presence of these rods that causes problems when drilling using known masonry drill bits. On encountering a rod, the drill is deflected affecting the hole being drilled, or the masonry drill bit simply extrudes the steel bar out of the way, damaging the drill bit. In either case, the rate of depth penetration is slowed significantly. Typically, once five bars have been encountered, known masonry drill bits are no longer usable.

Further, while it is important for a masonry drill bit to produce a hole in a workpiece as quickly as possible, it is believed that the life of the drill bit and a minimum of edge clipping of the hole are considered by users of masonry drill bits to be more important than a saving in the time needed to drill a hole in a given material with the drill bit.

It is an advantage of the present invention that it provides improved performance in drilling into a variety of materials, and in particular reinforced concrete and provides an improvement in the life and durability of a masonry drill bit.

According to the present invention a drill bit is provided comprising a shaft and a tip for engagement with a workpiece, the tip being formed with a plurality of stepped portions disposed either side of a central axis of the drill bit, the stepped portions being shaped to cut a workpiece as the drill bit rotates about the axis.

The tip preferably includes between the innermost stepped portions a central chisel edge defined by two pairs of flanks inclined away from the chisel edge. By including a flank on the leading edges of the central chisel edge, such that the central chisel edge has negative leading edges, failure of the drill bit tip is less likely to occur.

Preferably, the flanks of each pair are inclined at different angles. More preferably, one flank of each pair is inclined at between 30° and 40° to a plane perpendicular to the axis of the shaft, ideally about 35°, and the other flank of each pair is inclined at between 50° and 60°, ideally about 55°, to the same plane. The leading flank of each pair is the flank preferably inclined at about 55°.

In one embodiment, the tip may be tungsten carbide or some other equivalent material.

If the tip is steel, it is preferably formed integrally with the shaft of the drill bit. Of course, the tip may be manufactured from a different material to the shaft, if it is more appropriate to do so.

Preferably each stepped portion comprises two symmetrical cutting edges on opposite sides of the tip. Further, the cutting edges are preferably inclined rearwardly relative to the central chisel portion. More preferably, an angle of between 90° and 130° is formed between the two cutting edges in a plane accommodating the shaft. As a result, a cleaner edge to the hole being drilled can be achieved.

Preferably each cutting edge is defined by a flat which extends rearwardly of the cutting edge at an angle of between 35° and 40° relative to a plane perpendicular to the axis of the shaft.

The shaft preferably includes an helical web for assisting removal of debris during drilling, as in most normal masonry drill bits.

The present invention will now be described, by way of example only, with reference to the accompanying drawings, in which.

Figure 7:
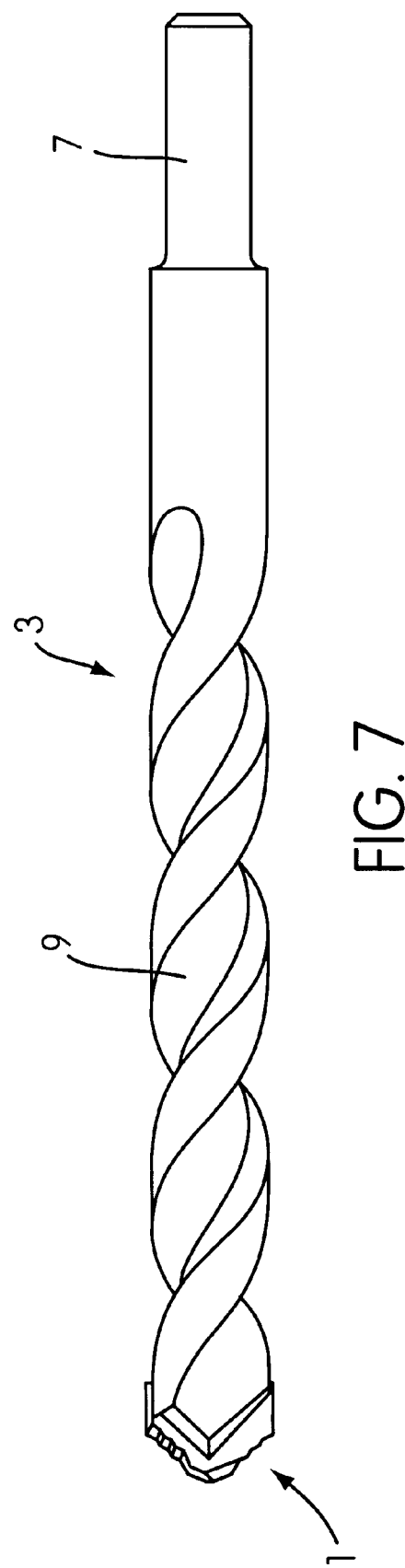
FIG. 7 shows a front view of a masonry drill bit.

Referring to the drawings, a masonry drill bit according to the present invention may comprise a shaft 3 (one end 2 of which is shown in ghost in FIGS. 2 to 5) and a drill bit tip 1. The shaft 3 includes a shank 7 for insertion in a chuck or tool holder of a drill or hammer and a helically twisted steel web 9 extending in a forward direction from the shank (FIG. 7). The web may be fluted or straight as is chosen for the required application. The end of the web is provided with a slot to receive the drill bit tip 1. The drill bit tip 1 may be manufactured from cemented tungsten carbide and fixed to the web by brazing. Alternatively, the tip 1 may be attached by welding or another suitable mechanical fixing arrangement.

Referring now to FIGS. 1 to 5, the drill bit tip 1 has a diameter D and comprises a central portion 11 and an outer portion 13. The central portion 11 has a width B between approximately 0.25D and 0.75D. The particular relative width of the central portion is dictated by the actual active diameter of the drill bit. For example, if the active diameter is small, such as 4 mm, the relative width of the central portion is preferably high, such as 0.75D. If the active diameter is large, such as 20 mm, the relative width of the central portion is smaller, such as 0.33D. This is because, if the relative width of the central portion is large for a drill bit having a large active diameter, the edge of the hole produced by the drill bit may become chipped or otherwise damaged during drilling.

The central portion 11 is shaped to act as a chisel when the drill bit is being used with a percussion drill or hammer. In such a use, the central portion of a hole being drilled is pounded or chiselled with the central portion of the drill bit, causing the workpiece to crack and disintegrate in this region. The outer portion of the drill bit forms the outer portion of the hole in a manner to be described.

The central portion 11 of the drill bit tip comprises a chisel edge 15 formed by two sets of flanks 17a, 17b; 19a, 19b. In use, the drill bit will rotate in the direction of arrow A in FIG. 3. As a result, the leading edge of the central portion 11 is defined by flanks 17a, 19a. The front flanks 17a, 19a are typically inclined at an angle of between about 50° and about 70° to a plane perpendicular to the axis of the drill bit. Preferably the angle is about 60° to the plane perpendicular to the axis of the drill bit. The trailing flanks 17b, 19b are not so steep, typically inclined at an angle of about 30° to the plane perpendicular to the axis of the drill bit.

The chisel edge 15 may be formed as a sharp edge where the flanks join. However, it has been found that a very slight curvature helps to avoid damage to the tip during use, such damage causing the drill bit to become unstable.

The outer portion of the drill bit tip 1 comprises, on either side of the central portion, cutting edges 21 formed between front and rear surfaces 23 of the tip, together with a series of inclined flats 25 which extend rearwardly of the cutting edges 21. The flats extend rearwardly of the cutting edges 21 at an angle of between 35° and 40° relative to a plane perpendicular to the axis of the shaft. The cutting edges are formed with steps. The steps comprise a number of downward parts joining each of the flats 25 in the series. Once again, the cutting edges 21 are provided with a slight curvature thereby avoiding catastrophic damage being caused to the cutting edge 21 during use.

Figure 1:
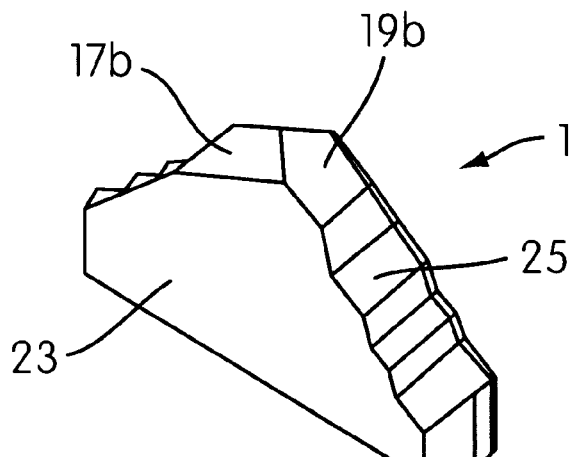
FIG. 1 shows a perspective view of a drill bit tip for use in the present invention.
Figure 2:
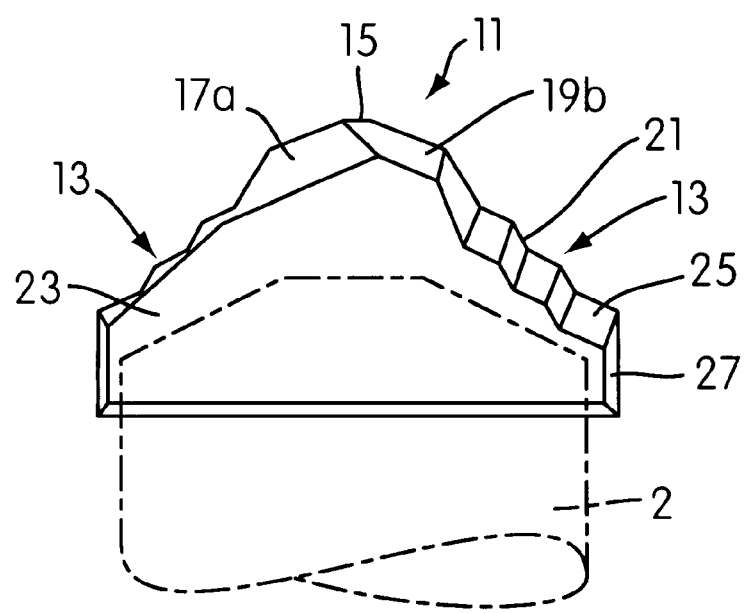
FIG. 2 shows a side view of the drill bit tip of FIG. 1.
Figure 3:
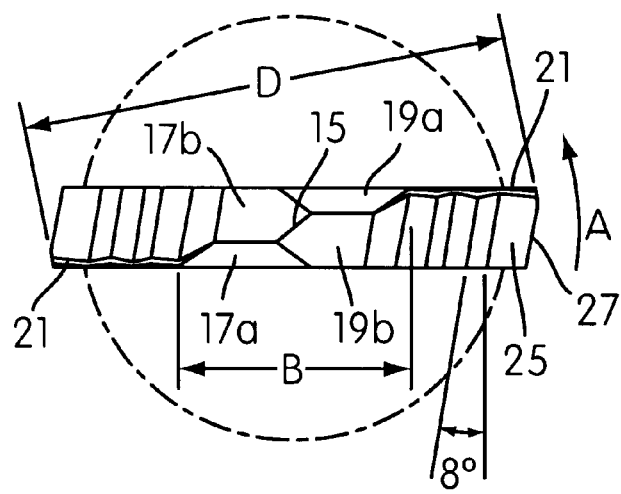
FIG. 3 shows a plan view of the drill bit tip of FIG. 1.
Figure 4:
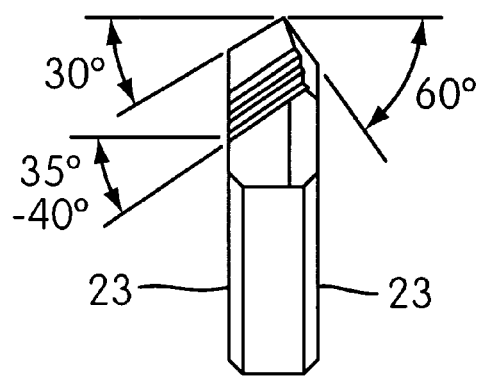
FIG. 4 shows a first end view of the drill bit tip of FIG. 1.
Figure 5:
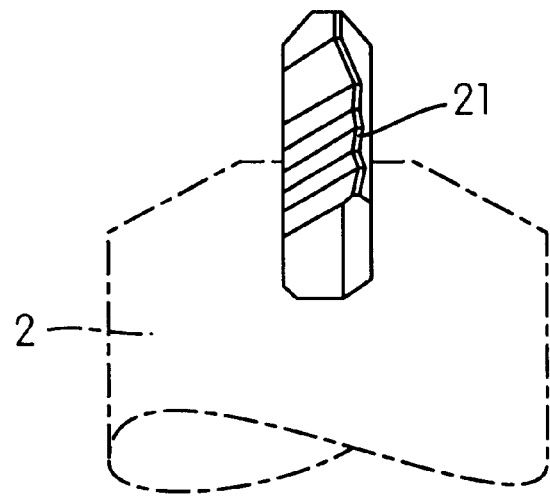
FIG. 5 shows a second end view of the drill bit tip of FIG. 1.

Each of the front and rear surfaces 23 form a lead-in face in the direction of rotation of the drill bit (direction A when viewed as FIG. 3), wherein each of the cutting edges 21 are set back from such lead-in surfaces 23 (FIG. 5). This is clearly seen in FIGS. 4 and 5 wherein the cutting edge 21 is formed between the series of inclined flats 25, which extend rearwardly of the cutting edges 21 and a front inclined surface extending forwardly of the cutting edge 21 and substantially co-planar with the flanks 19a and 17a respectively (FIG. 4).

The number of steps is related to the diameter of the drill bit. A larger drill bit (as in the embodiment of FIGS. 1 to 5) will typically have a greater number of steps than a drill bit of smaller diameter (as in the embodiment of FIG. 6). The angle included between the outward part of the cutting edges 21 may be between approximately 90° and 130° in the plane of the shaft. The number of steps is also related to the distance the drill bit moves during a hammering cycle. Preferably, the height of each stepped portion, in the direction of the drilling axis, is at least three times the distance the drill bit moves during a hammering cycle.

Outer sides 27 of the drill bit tip may taper inwardly from the cutting edges 21. This arrangement avoids fouling of the drill bit, and allows the drill bit tip to produce an accurate and clearly cut hole in the workpiece. Similarly the central portion and each of the steps may be tapered inwardly away from the leading surfaces 17a, 19a. Typically the degree of taper may be between 8° and 12°, and is preferably 8° as illustrated in FIG. 3.

In use, once the hole has been started as described above, the outer portion of the drill bit tip acts to cut the remainder of the hole. However, the steps in the outer portion of the drill bit tip mean that the outer portion can to a limited extent perform as a chisel along the entirety of the cutting edges 21. This two action drilling process produces a neat and accurate hole in a workpiece. Also, the changing of direction of the cutting edges by the step formation, that is the interruption of the cutting edges, leads to reduced cutting forces. Further any metal cut from a bar (in reinforced concrete), due to the interrupted nature of the cutting edges is formed as small chips rather than as lengths of swarf, the chips being easily transported away from the drilling site along the helically twisted steel web.

The stepped design of the cutting edge serves to improve the cutting performance of the drill tip when encountering a bar in reinforced concrete since, in comparison to a standard masonry drill tip, a smaller area of the tip (one step) will engage the bar, creating a greater force per unit area of the cutting edge in contact with the bar which allows the bar to be cut more readily.

Figure 6:
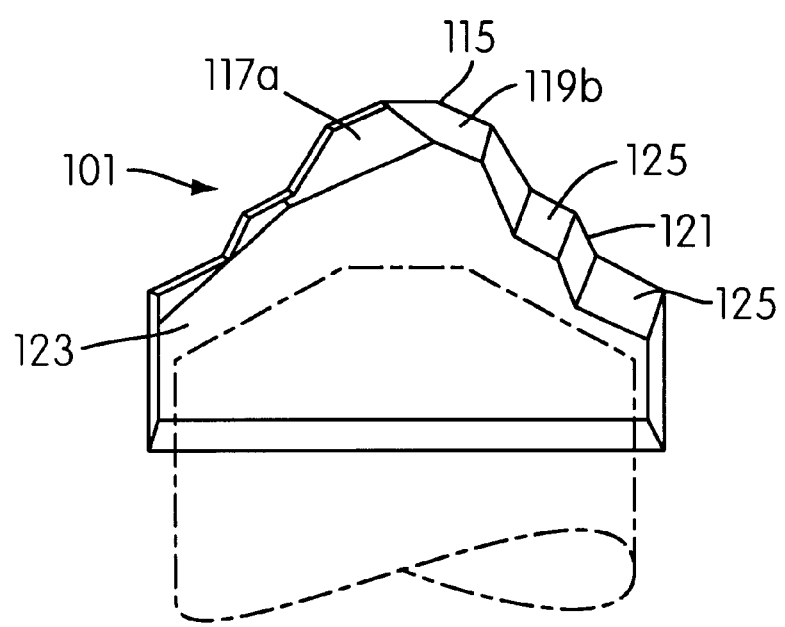
FIG. 6 shows a perspective view of a second embodiment of a drill bit tip for use in the present invention.

An second embodiment of a drill bit tip according to the invention is shown in FIG. 6. This embodiment is suitable for a drill bit of smaller diameter than that of the previous embodiment. As can be seen there are fewer stepped portions than in the previous embodiment.

The outer portion of the drill bit tip 101 comprises on either side of the central portion, cutting edges 121 formed between front and rear surfaces 123 of the tip together with a series of inclined flats 125 extend rearwardly of the cutting edges 121. The flats extend rearwardly of the cutting edges 121 at an angle of between 35° and 40° relative to a plane perpendicular to the axis of a shaft. The cutting edges are formed with steps. The steps comprise a number of downward parts joining each of the flats 125 in the series.

Between the innermost steps there is a central chisel edge 115 defined by two pairs of flanks (117a,119b shown; 117b,119a not shown) inclined away from the central chisel edge. One flank 117b, 119b of each pair is inclined at between 30°, and 40° to a plane perpendicular to the axis of the drill bit. One flank of each pair 117a, 119a is inclined at between 50° and 60° to a plane perpendicular to the axis of the drill bit.

We claim:

1. A drill bit comprising a shaft and a tip for engaging a workpiece, the tip being formed with a plurality of stepped portions disposed on either side of a central axis of the drill bit, the stepped portions being shaped to cut out a workpiece as the drill bit rotates about the axis, a central chisel edge defined by two pairs of flanks inclined away from the central chisel edge, one flank of each pair extending from said central axis across said plurality of stepped portions.

2. A drill bit as claimed in claim 1, wherein the plurality is two or three.

3. A drill bit as claimed in claim 1, wherein the flanks of each pair are inclined at different angles to a plane perpendicular to the axis of the drill bit.

4. A drill bit as claimed in claim 3, wherein one flank of each pair is inclined at between 30° and 40° to a plane perpendicular to the axis of the drill bit.

5. A drill bit as claimed in claim 3, wherein one flank of each pair is inclined at between 50° and 60° to a plane perpendicular to the axis of the drill bit.

6. A drill bit as claimed in claim 1, wherein the tip is tungsten carbide.

7. A drill bit as claimed in claim 1, wherein the central portion is steel.

8. A drill bit as claimed in claim 7, wherein the central portion is formed integrally with the shaft.

9. A drill bit as claimed in claim 1, wherein each stepped portion comprises two symmetrical cutting edges on opposite sides of the tip.

10. A drill bit as claimed in claim 9, wherein the cutting edges are inclined rearwardly relative to a plane perpendicular to the axis of the drill bit.

11. A drill bit as claimed in claim 10, wherein an angle of between 90° and 130° is formed between the two cutting edges in a plane of the shaft.

12. A drill bit as claimed in claim 9, wherein each cutting edge is defined by a series of flats which extend rearwardly from the cutting edge at an angle of between 35° and 40° relative to a plane perpendicular to the axis of the shaft.

13. A drill bit as claimed in claim 1, wherein the shaft includes a helical web for assisting removal of debris during drilling.

14. A drill bit as claimed in claim 13, wherein the web includes flutes.

15. A drill bit comprising a shaft and a tip for engaging a workpiece, the tip being formed with a plurality of stepped portions disposed on either side of a central axis of the drill bit, the stepped portions being shaped to cut out a workpiece as the drill bit rotates about the axis, wherein each stepped portion comprises two symmetrical cutting edges on opposite sides of the tip, wherein the cutting edges are inclined rearwardly relative to a plane perpendicular to the axis of the drill bit, wherein an angle of between 90° and 130° is formed between the two cutting edges in a plane of the shaft.

16. A drill bit comprising a shaft and a tip for engaging a workpiece, the tip being formed with a plurality of stepped portions disposed on either side of a central axis of the drill bit, the stepped portions being shaped to cut out a workpiece as the drill bit rotates about the axis, wherein each stepped portion comprises two symmetrical cutting edges on opposite sides of the tip, wherein each cutting edge is defined by a series of flats which extend rearwardly from the cutting edge at an angle of between 35° and 40° relative to a plane perpendicular to the axis of the shaft.

* * * * *